United States Patent
Desai et al.

(10) Patent No.: US 12,265,837 B2
(45) Date of Patent: Apr. 1, 2025

(54) MACHINE LEARNING TO EMULATE SOFTWARE APPLICATIONS

(71) Applicant: International Business Machines Corporation, Armonk, NY (US)

(72) Inventors: Nirmit V Desai, Yorktown Heights, NY (US); Jae-Wook Ahn, Nanuet, NY (US); Tova Roth, Woodmere, NY (US); Dinesh C. Verma, New Castle, NY (US); Douglas M. Freimuth, New York, NY (US); Seraphin Bernard Calo, Cortlandt Manor, NY (US); Anshu Kak, Englewood Cliffs, NJ (US); Steven A Waite, Racine, WI (US); Roger Hollander, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 18/302,237

(22) Filed: Apr. 18, 2023

(65) Prior Publication Data
US 2024/0354132 A1  Oct. 24, 2024

(51) Int. Cl.
*G06F 9/455* (2018.01)
*G06N 3/02* (2006.01)
*G06N 3/08* (2023.01)

(52) U.S. Cl.
CPC ........... *G06F 9/45508* (2013.01); *G06N 3/02* (2013.01); *G06N 3/08* (2013.01)

(58) Field of Classification Search
CPC ...... G06F 9/45508; G06N 3/02; G06N 3/044; G06N 3/0442; G06N 3/08
USPC .......................................................... 717/138
See application file for complete search history.

(56) References Cited

U.S. PATENT DOCUMENTS

| | | | |
|---|---|---|---|
| 6,789,182 B1 * | 9/2004 | Brothers | H04L 43/0811 714/39 |
| 9,021,484 B2 | 4/2015 | Branch et al. | |
| 10,250,471 B2 | 4/2019 | Hotta et al. | |
| 10,855,707 B2 | 12/2020 | Zhang et al. | |
| 11,243,834 B1 | 2/2022 | Mandal et al. | |
| 11,418,571 B1 | 8/2022 | Singh et al. | |

(Continued)

FOREIGN PATENT DOCUMENTS

WO  WO-2021145862 A1 * 7/2021 ......... G06F 16/9574

OTHER PUBLICATIONS

Aalst, "Process Mining: Overview and Opportunities", ACM Trans. Manage. Inf. Syst. 3, 2, Article 7, Jul. 2012, pp. 1-17.

(Continued)

*Primary Examiner* — Geoffrey R St Leger
(74) *Attorney, Agent, or Firm* — Tutunjian & Bitetto, P.C.; Robert Richard Aragona

(57) ABSTRACT

Methods and systems for emulating an application include generating a log template to match one or more patterns in a set of application logs collected from an original application. Semantic state representations are learned for the original application from the log template. A classifier is trained to predict a next action template based on a sequence of prior action templates. A regressor is trained to generate a parameter value for a template based on a sequence of prior action templates and a particular semantic state of the original application.

18 Claims, 7 Drawing Sheets

(56) References Cited

U.S. PATENT DOCUMENTS

| | | | |
|---|---|---|---|
| 11,467,862 | B2 | 10/2022 | Sharma et al. |
| 11,494,255 | B2 | 11/2022 | Wang |
| 11,513,930 | B2 | 11/2022 | Chan et al. |
| 11,520,681 | B2 | 12/2022 | Yu et al. |
| 2020/0382612 | A1* | 12/2020 | Zhao ................ G06N 3/08 |
| 2021/0081437 | A1 | 3/2021 | Maciolek et al. |
| 2022/0019935 | A1 | 1/2022 | Ghatage et al. |
| 2022/0308981 | A1 | 9/2022 | Zeigen et al. |
| 2024/0119090 | A1* | 4/2024 | Gopalsamy ............ G06F 9/542 |

OTHER PUBLICATIONS

Chen et al., "BERT-Log: Anomaly Detection for System Logs Based on Pre-trained Language Model", Applied Artificial Intelligence. Dec. 31, 2022, pp. 1-24.

Du et al., "DeepLog: Anomaly Detection and Diagnosis from System Logs through Deep Learning", In Proceedings of the 2017 ACM SIGSAC conference on computer and communications security, Oct. 3, 20170, pp. 1285-1298.

Devlin et al., "RobustFill: Neural Program Learning under Noisy I/O", Inl International conference on machine learning Jul. 17, 2017, pp. 990-998.

Luo et al., "Log Analytics in HPC: A Data-driven Reinforcement Learning Framework", InIEEE INFOCOM 2020-IEEE Conference on Computer Communications Workshops (INFOCOM Wkshps), Jul. 6, 2020, pp. 550-555.

Lee et al., "LogGC: Garbage Collecting Audit Log", InProceedings of the 2013 ACM SIGSAC conference on Computer & communications security, Nov. 4, 2013, pp. 1005-1016.

He et al., "Loghub: A Large Collection of System Log Datasets towards Automated Log Analytics", arXiv:2008.06448v1 [cs.SE] Aug. 14, 2020, pp. 1-9.

Graves et al., "Hybrid computing using a neural network with dynamic external memory", Nature. Oct. 27, 2016, pp. 471-491.

* cited by examiner

MACHINE LEARNING TO EMULATE SOFTWARE APPLICATIONS

BACKGROUND

The present invention generally relates to software emulation and, more particularly, to the use of machine learning to emulate legacy software applications.

Certain industries, such as the financial sector, make use of software that was originally developed decades ago and that has remained in operation ever since. Such systems typically have undergone a number of in-production updates to introduce new features and to fix problems, such that the present-day system can be difficult to replicate or modernize.

SUMMARY

A method for emulating an application includes generating a log template to match patterns in a set of application logs collected from an original application. Semantic state representations are learned for the original application from the log templates. A classifier is trained to predict a next action template based on a sequence of prior action templates. A regressor is trained to generate a parameter value for a template based on a sequence of prior action templates and particular semantic state of the original application.

A system for emulating an application includes a hardware processor and a memory that stores a computer program. When executed by the hardware processor, the computer program causes the hardware processor to generate a log template to match patterns in a set of application logs collected from an original application, to learn semantic state representations for the original application from the log templates, to train a classifier to predict a next action template based on a sequence of prior action templates, and to train a regressor to generate a parameter value for a template based on a sequence of prior action templates and particular semantic state of the original application.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Application software may be emulated using machine learning systems that learn from application logs from legacy systems, even when access to the source code of the application software is not accessible or available. These logs are used to learn series of functions that each take certain inputs and produce certain outputs, with the output of one function in the series being used as the input to the next function in the series. The inputs and outputs recorded in the application logs train a machine learning model to replicate the functions of the original software, so that the emulated application can perform in place of the original software.

Emulation of software may be useful in contexts where regulations necessitate local residency or replication of data, but where replicating the full hardware and software stack locally would be challenging. For example, financial systems may include software stacks that date back decades, running on hardware that is no longer commercially available. Emulating the software stack makes it possible to implement the application in any location, on any appropriate hardware. If the emulated system encounters a request that it cannot handle, for example because the request not captured in the application logs that were used during training, then the request can be escalated to a human operator to handle manually.

Figure 1:
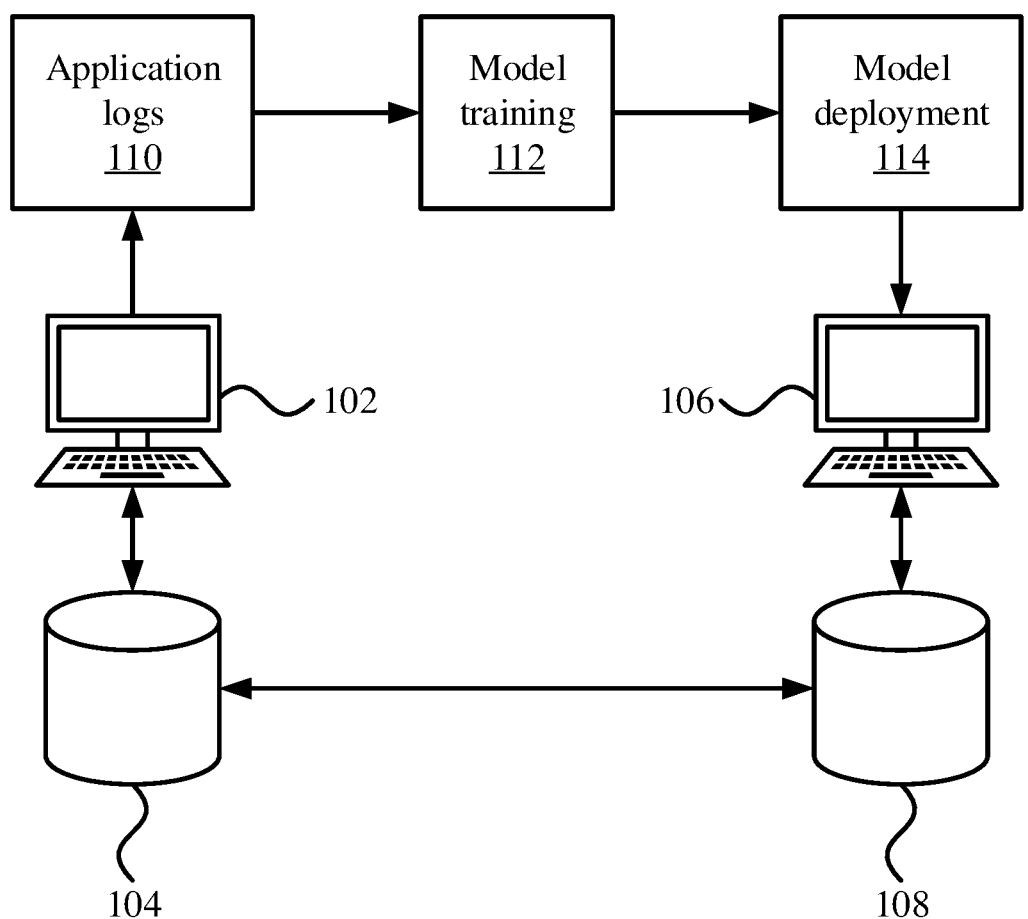
FIG. 1 is a diagram of a pair of computer systems, one running an original application and one running an emulated application, showing training and deployment of a model to emulate the application, in accordance with an embodiment of the present invention.

Referring now to FIG. 1, a distributed computing system is shown. It is specifically contemplated that the system may be distributed across international borders, but it should be understood that the multiple locations may be any two locations, even in contexts where the systems may be considered to be collocated. It should furthermore be understood that the distributed computing principles described herein may be omitted in some embodiments, with an emulated software application being implemented in a computer system that is wholly unconnected from any original system.

The system includes an original computer system 102, which operates on a first database 104. The original computer system 102 may perform read and write operations on the first database 104. Although represented as single entities, it should be understood that each of the original computer system 102 and the first database 104 may be implemented on multiple pieces of hardware, for example in a distributed or cloud computing arrangement.

The original computer system 102 includes a hardware and software stack that perform an application. For example, the original computer system 102 may perform a transactional function, whereby the original computer system 102 receives requests, attempts to process the requests using the first database 104, and provides responses that reflect the state of the first database 104. The software of the original computer system 102 may include logging functions that track individual functions of the software, saving log information to local memory or storage.

A remote computer system 106 is established in a second location. For example, the original computer system 102 may be housed in a first country, which may have a first set of regulations that govern its operation, and the remote computer system 106 may be housed in second country, with a second set of regulations that impose different requirements as compared to the first set of regulations. The remote computer system 106 may operate on a second database 108, for example to perform local read and write operations. The first database 104 and the second database 108 may be kept consistent by any appropriate mechanism, so that the original computer system 102 and the remote computer system 106 operate on the same data.

To deploy the remote computer system 106, the logs of the operating software of the original computer system 102 are analyzed and emulated. To that end, the original system 102 collects and stores application logs 110. These logs 110 may include a variety of information, including identifying functions as well as the inputs and outputs to those functions. A semantic understanding of the functions may not be available—instead, templates may be generated from the logs that identify functions by groups of similar log entries.

Based on the collected application logs, model training 112 is used to train a machine learning model to replicate the functions. For example, based on the inputs and outputs to a given function, the function may be emulated so that the model will generate similar outputs if given similar inputs. The machine learning model may be implemented as, for example, a form of recurrent neural network, such as a long-short term memory (LSTM) network or a transformer. The machine learning model may thereby implement a classifier that predicts a next action or state of the software application based on the results of the previous action and other contextual information. The application logs can be represented as sequences of functions, from an initial input to a final output, and these forms of machine learning model are well suited to handling sequential data. It should be understood that a wide variety of training methods may be employed, including self-supervised training on generic log data followed by fine-tuning on the log data from a particular application software.

Once the model has been trained, it may be deployed 114 at the remote computer system 106. Notably, the remote computer system 106 may be implemented using any appropriate hardware, including commercially available hardware, and need not replicate the hardware of the original computer system 102. Because the model emulates the functions of the software of the original computer system 102, without needing to copy the specific source code or executable binaries of that software, the model may be executed using any hardware that is convenient.

As noted above, the internal implementation of any application can be represented as a series of functions, $f_1, \ldots, f_n$, each of which takes an input and produces an output. During the execution of some operation by the application, a particular series of functions leads from the initial input to the generation of the final output. The initial input may correspond to a request to the application, for example by a user, and the final output may correspond to the response produced by the application. Intermediary outputs may correspond to reading data, writing data, invoking external services, or applying any appropriate form of logic. The application logs 110 may capture all of the inputs and outputs of the application during operation, under a wide variety of inputs.

The number of possible inputs and the possible outputs generated by the application are unknown beforehand, and are potentially (or effectively) infinite. The application is furthermore stateful, which does not lend itself to a fixed or predetermined input shape that can be represented as a simple vector. Thus the present model is distinct from application emulation that relies on fully characterized input and output parameters.

Figure 2:
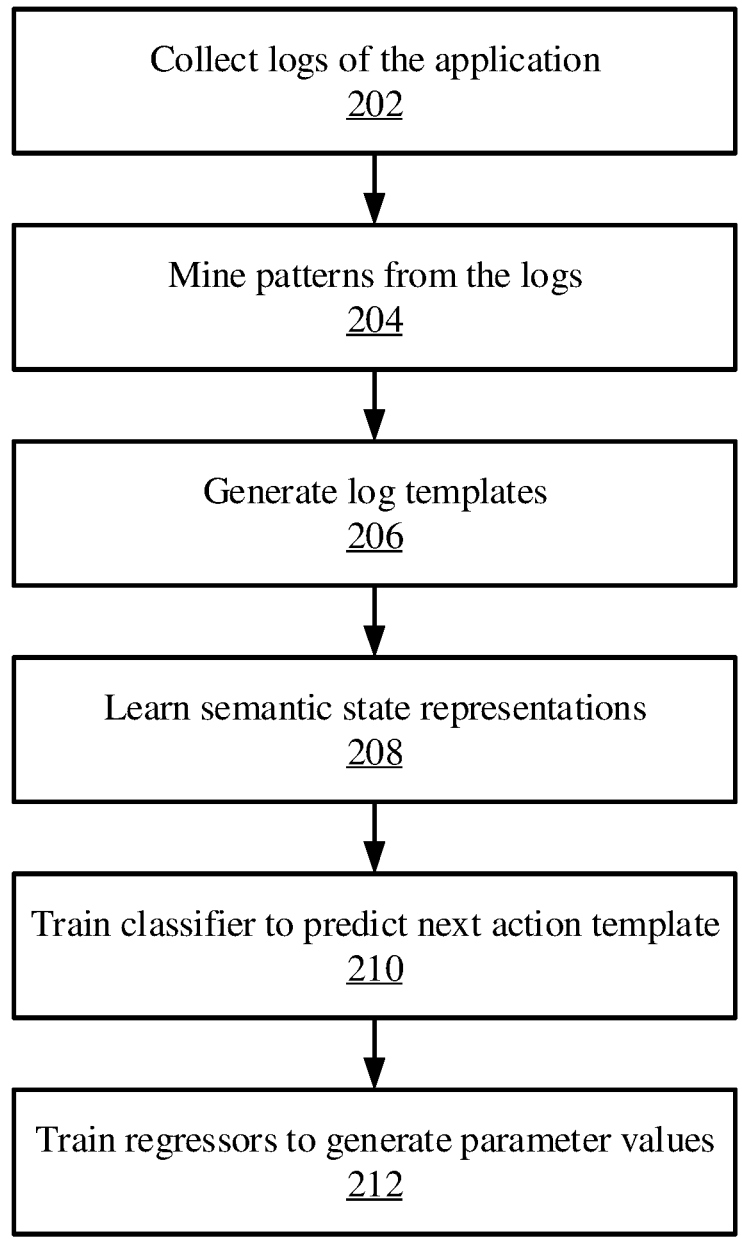
FIG. 2 is a block/flow diagram of a method for learning to emulate an application, in accordance with an embodiment of the present invention.

Referring now to FIG. 2, one possible method of training a model to emulate an application is shown. Block 202 collects logs of the application that is to be emulated. As described above, the application logs may characterize functions within the application by their inputs and outputs, and may include a variety of different operations performed by the application, including data read/write operations and application programming interface (API) calls to other applications or system services. In the case of date read/write events, both the read/write request and the results are logged. In the case of API calls, the API request as well as any response from the API are logged. Logs associated with the execution of internal logic may not be available.

Block 204 mines patterns from the application logs. The patterns may include a general pattern of the requests, responses, and interactions. For example, although the logs may show a variety of read/write requests, the underlying application logic may have a relatively small number of patterns for these interactions, such as parameterized database queries. The patterns may be represented as templates $t_{req}, t_0, t_1, \ldots t_{req}$ in block 206, where $t_{req}$ represents a request template, $t_i$ represents intermediate interaction templates, and $t_{res}$ represents a response template.

For example, a given function within the application may generate a similar log entry every time it is called, with fields that differ from instance to instance according to the particulars of the input. In a data read/write request, the application may log the input including the target of the request and an output that reflects the success or failure of the function. The inputs and outputs logs may include variable fields, such as values of the various parameters, as well as invariant fields that are consistent across all instances where the input is targeting the same internal function. Any log entry that matches the invariant fields, whether or not it matches the variable fields, may be considered to match the template.

Block 208 learns representations of the semantic states of the application. The application state may be captured in the results of the intermediate interactions. For example, these results may include a result set returned by a read database query, an API response from an external service, or a result code returned by data write to a file system. Block 210 trains a classifier to predict the next intermediate action template $t_i$ given the original request $t_{req}$, the previous actions in the series $t_0, \ldots, t_{i-1}$, and the semantic state of the application.

For each parameter of a template, which may be determined according to the inputs provided to the associated function, a regressor is trained that generates actual parameter values given a request, previous actions in the sequence arising from the request, and the semantic state of the application. The regressor may be implemented using any appropriate functional form, with a regression process being performed to fit the functional form to match the training data.

The trained model and the regressors may be used to generate an executable emulated application for any appropriate hardware and software stack. When executed, the emulated application will accept requests, perform functions, and generate outputs, including data read/write operations and API calls, as if it were the original software itself. The emulated application can be transmitted to remote computer system 106 by any appropriate communications mechanism for deployment.

Once the emulated application has been deployed to the remote computer system 106, it may be executed locally like any other software application. The emulated application will accept inputs to the remote computer system 106 and will perform functions and generate outputs in the same manner as the software of the original computer system 102. Operations will be performed on the second database 108, with data consistency between the first database 104 and the second database 108 being ensured by any appropriate mechanism. In some cases, database 108 and database 104 may store disjoint sets of data. For example, each database located in a different country may storing the data pertinent to the respective country. In such cases, there may be no need to keep the two databases consistent with each other.

Figure 3:
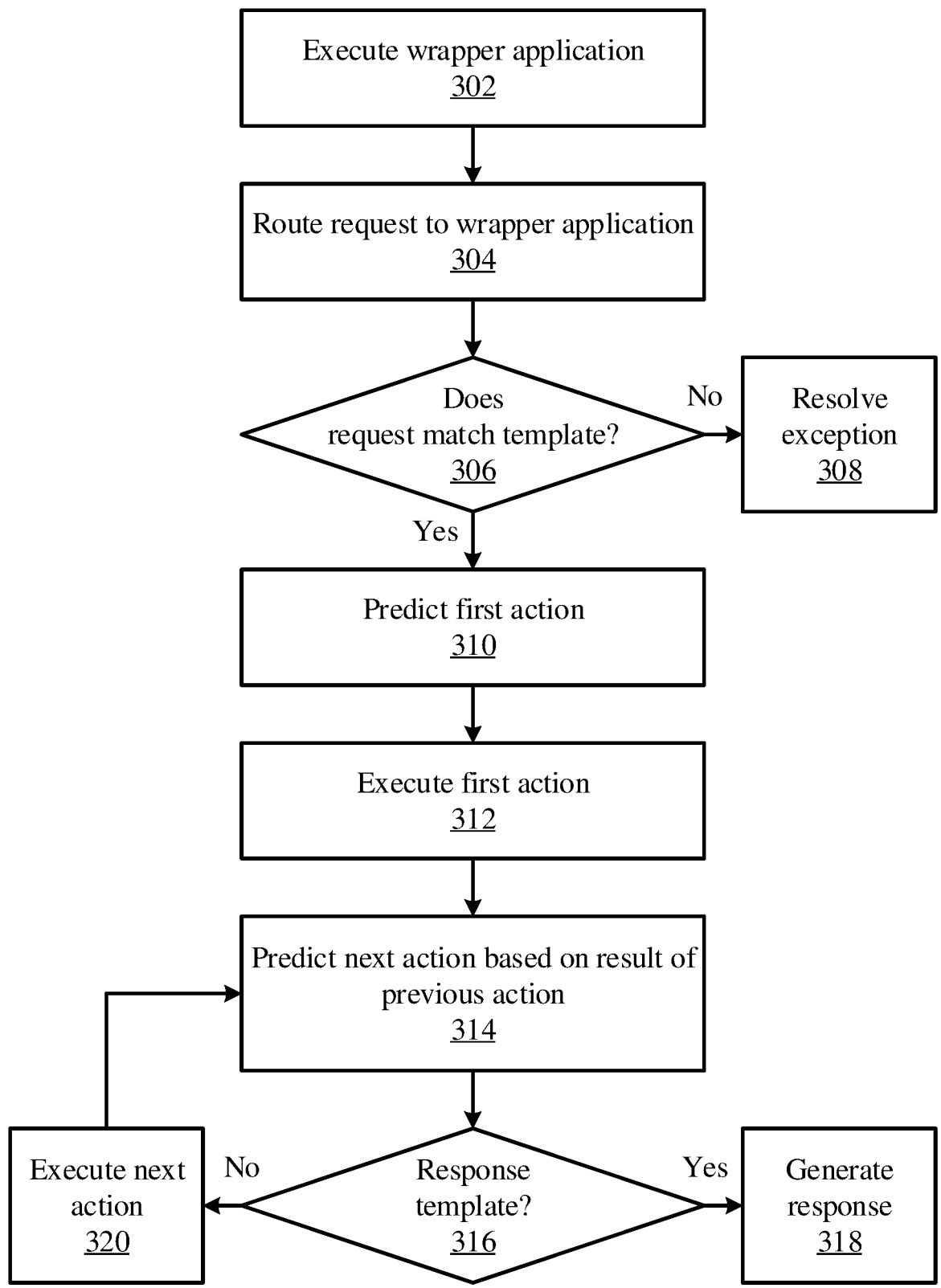
FIG. 3 is a block/flow diagram of a method for executing an emulated application trained from application logs, in accordance with an embodiment of the present invention.

Referring now to FIG. 3, a method of operating an emulated software application is shown. A wrapper application is executed 302, which translates the trained emulation model into locally executable software. The wrapper may make use of the learned templates, the trained action prediction classifier, and the regressors which are deployed to the remote computer system 106. The templates, trained classifier, and regressors are platform-agnostic, and the wrapper application interprets and executes them within the context of the particular hardware and software stacks of the remote computer system 106. Thus, the same emulated application may be deployed to any appropriate hardware and software environment using an appropriate wrapper application. When the wrapper application is executed with the trained action prediction classifier, the learned templates, and the regressors, it acts as the emulated software application. In some cases, the wrapper application may be responsive to changes in regulatory restrictions, to implement the emulated application in a way that is compliant with those changes.

A request is routed 304 to the wrapper application. This request may be received from any appropriate source, such as the customer of a bank or a website issuing a database query. The request may represent a particular command with one or more user-defined parameters. The emulated software application attempts to match one of the templates to the request in block 306. If there is no matching template, then it can be inferred that the request represents an input that was not seen during the acquisition of application logs 202. Such requests may be considered exceptions. In the event that an exception is encountered, block 308 resolves the exception. Resolving the exception may include simply responding with an error code or may include escalating the request to a human operator, who may be better able to interpret the novel input. Actions taken by the human operator may be used to generate new application logs, which may in turn be used to develop templates for future operation of the emulated applications.

If the request does match a template, block 310 uses the trained action prediction classifier model to predict a first action to respond to the request. For example, such an action may include a read request to access data from the database. The trained action prediction classifier model uses the input parameters of the request and the matching template to select a template corresponding to a next function to be performed. Parameters for the selected template are generated using the regressor(s) corresponding to the selected template to generate the first action. Block 312 then executes the first action, for example performing an associated function within the remote computer system 106 in accordance with the generated parameters. The execution of the action generates a result, for example providing the output of a read function, indicating the success of a write function, or indicating the success or failure of any arbitrary function.

Block 314 predicts a next action, based on the result of the first action. The result may be mapped to a semantic vector representation using an application state vectorizer. The response generated by the action is used as input to the classifier, which generates a next template, and to the regressors, which generate appropriate parameters. Block 316 determines whether the next template is a response template that indicates the completion of the request. If so, block 318 generates and outputs a response, for example indicating to the user whether the request succeeded or failed. The wrapper application may format the response and send it to the user or to any other appropriate target.

If the template is not a response, then it indicates a next action to be performed. Block 320 executes the next action, generating a next result, and processing returns to block 314. Actions are generated and executed in the sequence until block 316 does encounter a response template as noted above. The sequence may have any appropriate length, in accordance with the actions being performed to satisfy the original request.

Figure 4:
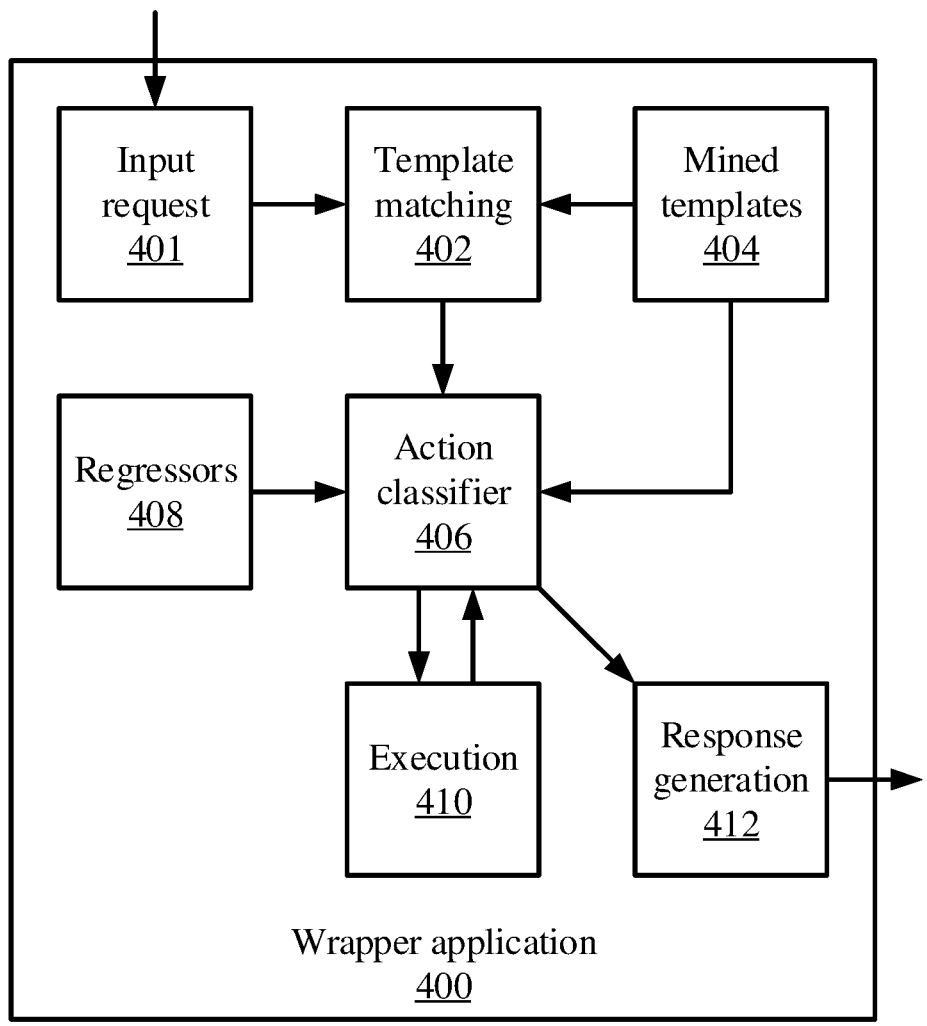
FIG. 4 is a block diagram of a wrapper application that is used to deploy an emulated application on a remote computer, in accordance with an embodiment of the present invention.

Referring now to FIG. 4, a block diagram of the wrapper application 400 is shown, as it may be implemented within a remote computer system 106. The wrapper application 400 accepts input request 401 from a user, from a service within the remote computer system 106, or from another computer system. Template matching 402 matches the input request to one of the mined templates 404 to identify a request template. The request template characterizes the type of action being requested, with parameters for the action being specified by the request.

Action prediction classifier 406 includes the trained classifier model. Based on the request template and the parameters of the request, the action prediction classifier 406 generates a first template corresponding to a first action to be performed. Regressors 408 are used to identify first parameter values to go with the first template, and the first template and first parameters are sent to execution 410. Execution 410 performs the corresponding first action and refers any results back to action prediction classifier 406.

The action prediction classifier 406, regressors 408, and execution 410 iterate in this manner, performing a sequence of actions that are each based on the results of the previous action, until the action prediction classifier 406 generates a response template. The wrapper application uses response generation to output a response to the initial request, which may be sent to the user, other service, or other computer.

Figure 5:
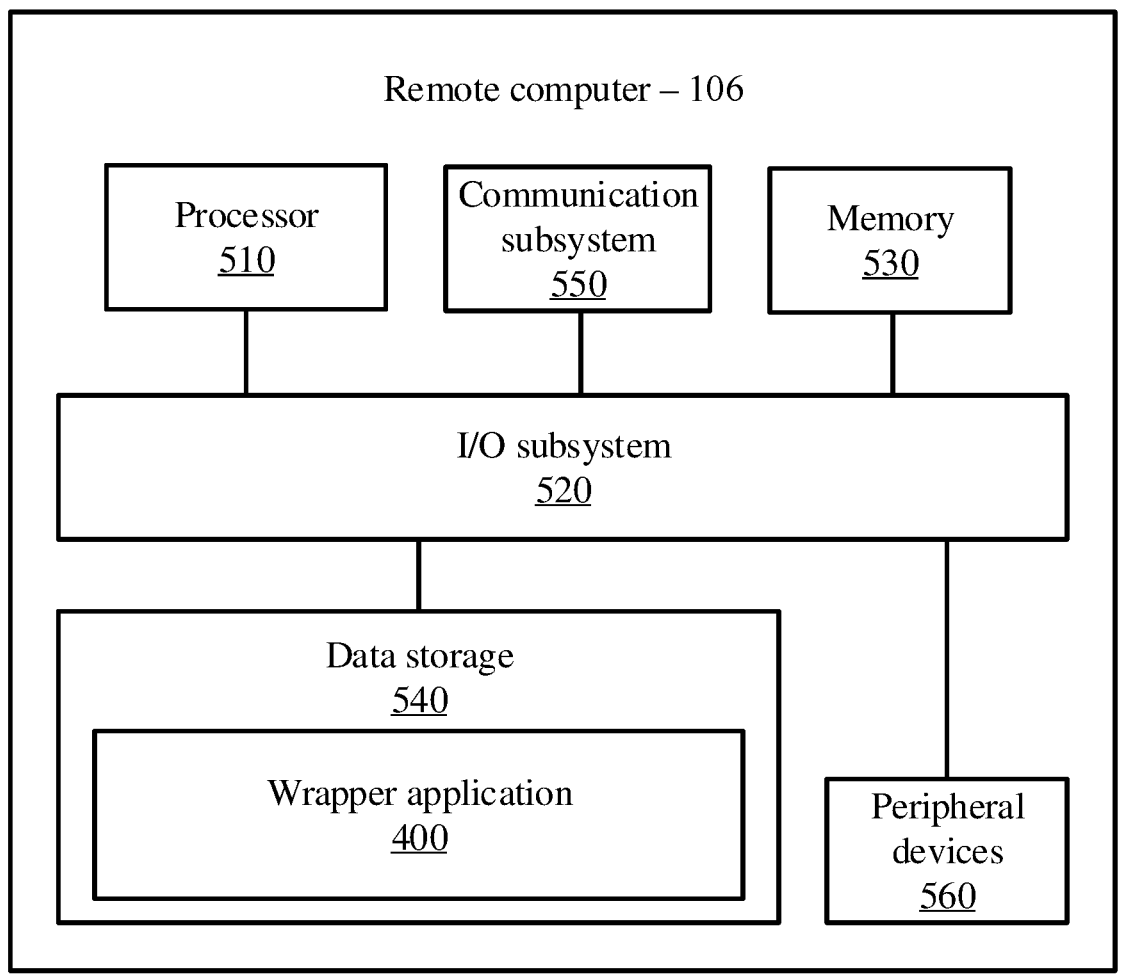
FIG. 5 is a block diagram of a computer system to execute a wrapper application that emulates an original software application, in accordance with an embodiment of the present invention.

FIG. 5 is a block diagram showing an exemplary remote computer system 106, in accordance with an embodiment of the present invention. The remote computer system 106 is configured to implement an emulated software application as described above.

The remote computer system 106 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the remote computer system 106 may be embodied as a one or more compute sleds, memory sleds, or other racks, sleds, computing chassis, or other components of a physically disaggregated computing device.

Figure 6:
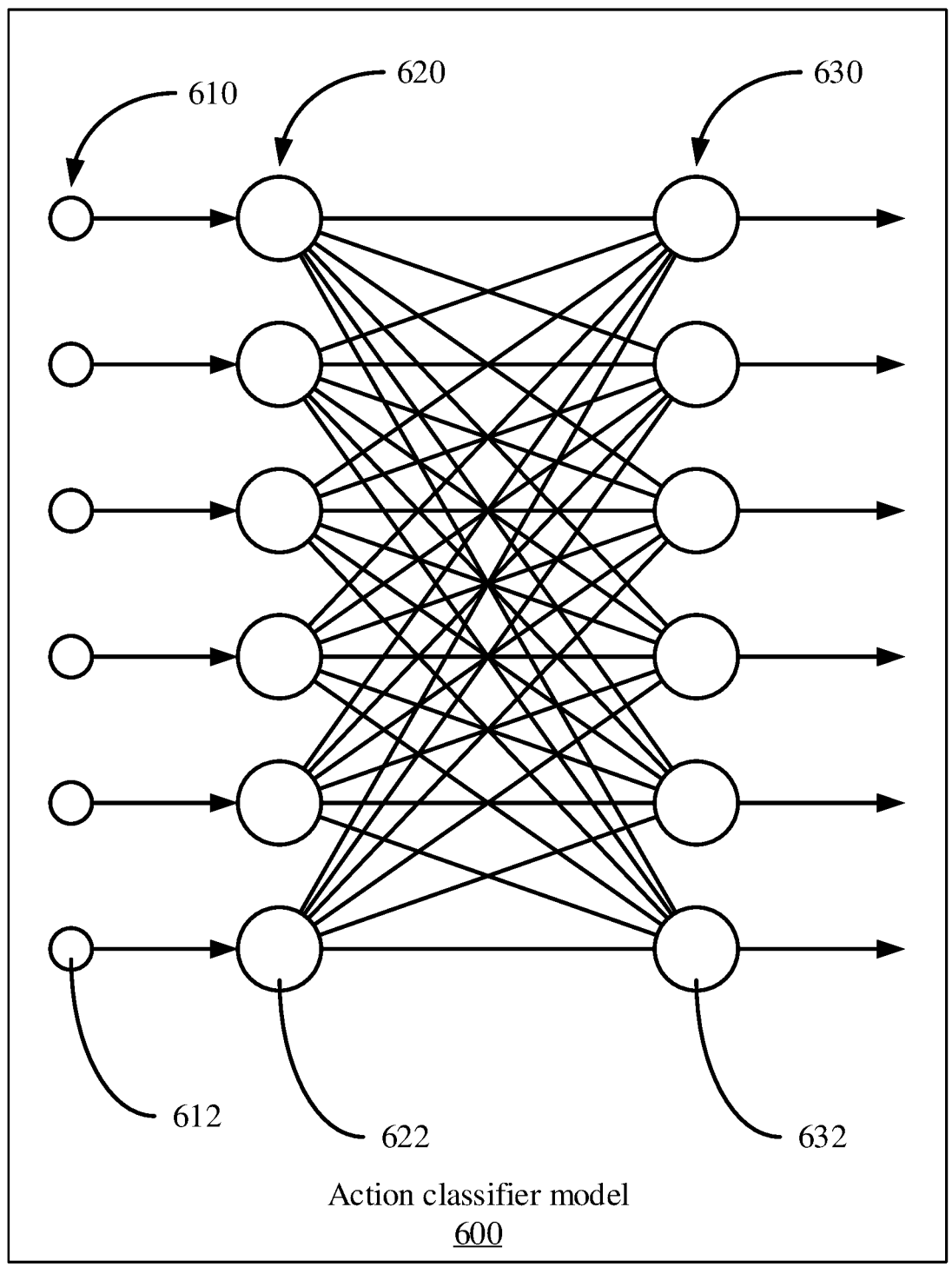
FIG. 6 is a diagram of a neural network architecture that may be used as part of an action classifier model, in accordance with an embodiment of the present invention.

Referring now to FIG. 6, a diagram of part of an exemplary neural network model is shown, which may be used in the action prediction classifier model 600. A multilayer perceptron is shown, but it should be understood that other neural network structures may be appropriate, such as recurrent neural networks or transformers. In layered neural networks, nodes are arranged in the form of layers. An exemplary simple neural network has an input layer 620 of source nodes 622, and a single computation layer 630 having one or more computation nodes 632 that also act as output nodes, where there is a single computation node 632 for each possible category into which the input example could be classified. An input layer 620 can have a number of source nodes 622 equal to the number of data values 612 in the input data 610. The data values 612 in the input data 610 can be represented as a column vector. Each computation node 632 in the computation layer 630 generates a linear combination of weighted values from the input data 610 fed into input nodes 620, and applies a non-linear activation function that is differentiable to the sum. The exemplary simple neural network can perform classification on linearly separable examples (e.g., patterns).

Training a deep neural network can involve two phases, a forward phase where the weights of each node are fixed and the input propagates through the network, and a backwards phase where an error value is propagated backwards through the network and weight values are updated.

The computation nodes 632 in the one or more computation (hidden) layer(s) 630 perform a nonlinear transformation on the input data 612 that generates a feature space. The classes or categories may be more easily separated in the feature space than in the original data space.

A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

Figure 7:
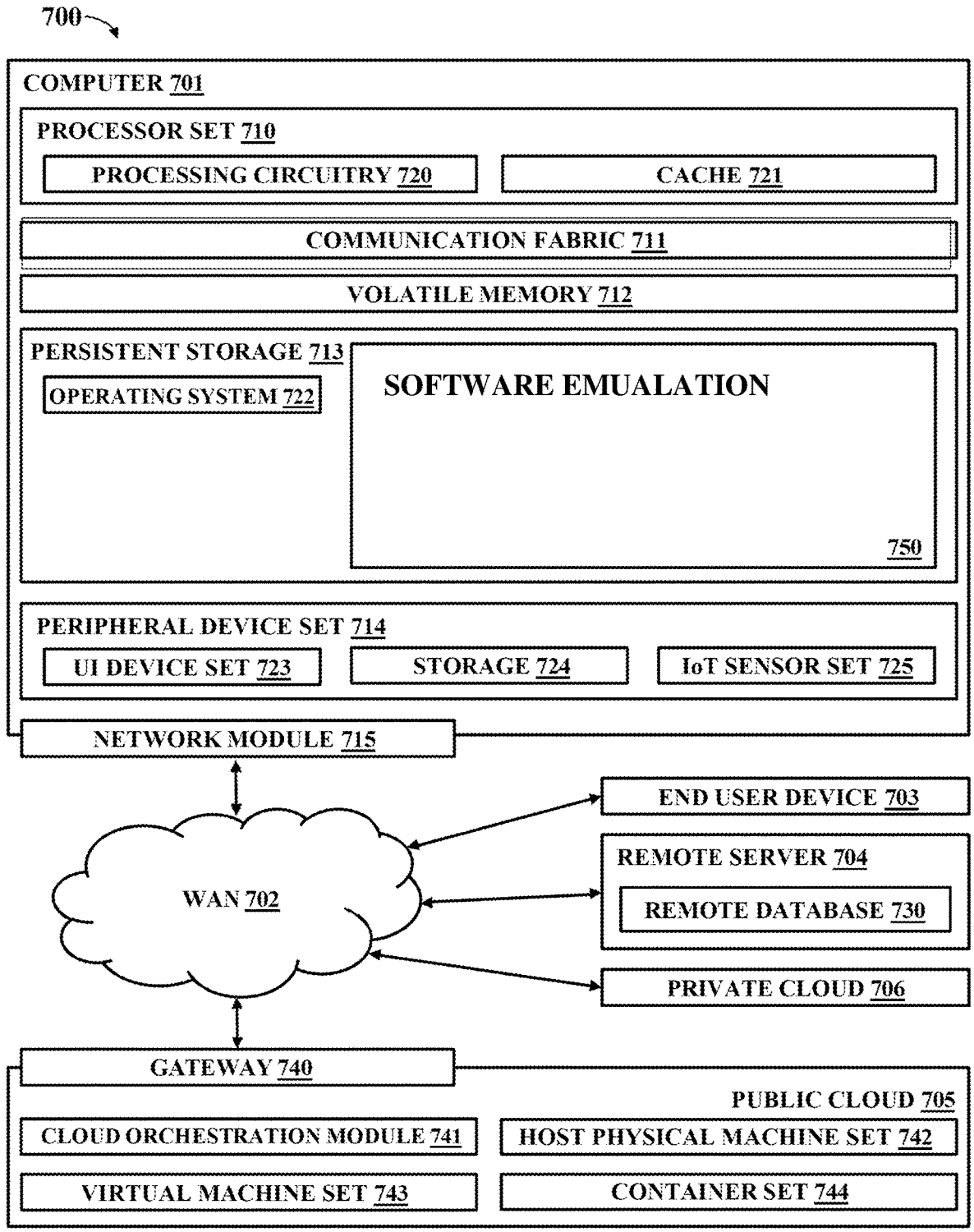
FIG. 7 is a block diagram of an exemplary computer system to train an emulation model and/or to execute an emulated application, in accordance with an embodiment of the present invention.

Referring now to FIG. 7, a block diagram of a computing environment 100 is shown.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as emulation of a software application 750. In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI) device set 723, storage 724, and Internet of Things (IOT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of machine learning to emulate software applications (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for emulating an application, comprising:
   generating a log template to match one or more patterns in a set of application logs collected from an original application;
   learning semantic state representations for the original application from the log template;
   training a classifier to predict a next action template based on a sequence of prior action templates;
   training a regressor to generate a parameter value for a template based on a sequence of prior action templates and a particular semantic state of the original application; and
   deploying the classifier, the regressor, and the log template to a remote computer system for execution to emulate the original application.

2. The computer-implemented method of claim 1, wherein the classifier is a recurrent neural network model.

3. The computer-implemented method of claim 2, wherein the recurrent neural network model is implemented as a long-short term memory (LSTM) model or a transformer model.

4. The computer-implemented method of claim 1, further comprising collecting the set of application logs from the original application during operation of the original application.

5. The computer-implemented method of claim 4, wherein the set of application logs include requests received by the original application, responses provided by the original application; and interactions between the original application and external systems.

6. The computer-implemented method of claim 1, wherein generating the log template includes mining parameterized templates from the set of application logs to represent requests, responses, and interactions as an instance of one of the parameterized templates.

7. The computer-implemented method of claim 1, wherein the semantic state of the original application is represented as a semantic vector.

8. The computer-implemented method of claim 1, wherein deploying includes providing a wrapper application that is executable on the remote computer system to implement the trained classifier and the regressor.

9. The computer-implemented method of claim 1, wherein the sequence of prior action templates includes a request template and one or more intermediate action templates that characterize a function of the original application.

10. A computer program product for emulating an application, the computer program product comprising a computer readable storage medium having program instructions embodied therewith, the program instructions executable by a hardware processor to cause the hardware processor to:
- generate a log template to match patterns in a set of application logs collected from an original application;
- learn semantic state representations for the original application from the log template;
- train a classifier to predict a next action template based on a sequence of prior action templates;
- train a regressor to generate a parameter value for a template based on a sequence of prior action templates and a particular semantic state of the original application; and
- deploy the classifier, the regressor, and the log template to a remote computer system for execution to emulate the original application.

11. A system for emulating an application comprises:
a hardware processor; and
a memory that stores a computer program which, when executed by the hardware processor, causes the hardware processor to:
- generate a log template to match patterns in a set of application logs collected from an original application;
- learn semantic state representations for the original application from the log template;
- train a classifier to predict a next action template based on a sequence of prior action templates;
- train a regressor to generate a parameter value for a template based on a sequence of prior action templates and a particular semantic state of the original application; and
- deploy the classifier, the regressor, and the log template to a remote computer system for execution to emulate the original application.

12. The system of claim 11, wherein the classifier is a recurrent neural network model.

13. The system of claim 12, wherein the recurrent neural network model is implemented as a long-short term memory (LSTM) model or a transformer model.

14. The system of claim 11, wherein the computer program further causes the hardware processor to collect the set of application logs from the original application during operation of the original application.

15. The system of claim 14, wherein the set of application logs include requests received by the original application, responses provided by the original application; and interactions between the original application and external systems.

16. The system of claim 11, wherein the computer program further causes the hardware processor to mine parameterized templates from the set of application logs to represent requests, responses, and interactions as an instance of one of the parameterized templates.

17. The system of claim 11, wherein the semantic state of the original application is represented as a semantic vector.

18. The system of claim 11, wherein the sequence of prior action templates includes a request template and one or more intermediate action templates that characterize a function of the original application.

* * * * *